April 13, 1954     W. J. CARNEY     2,674,940
MULTIPLE CARD SYSTEM
Filed Aug. 15, 1951
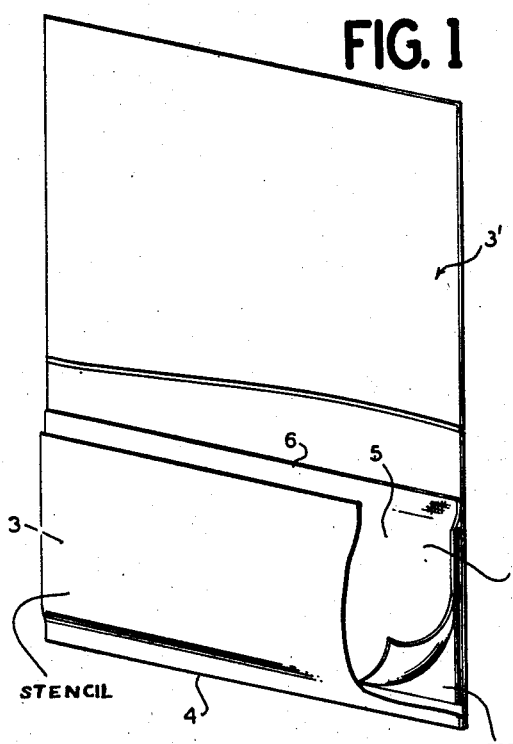
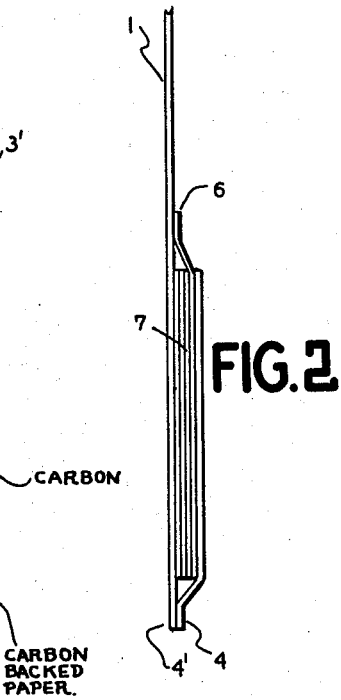
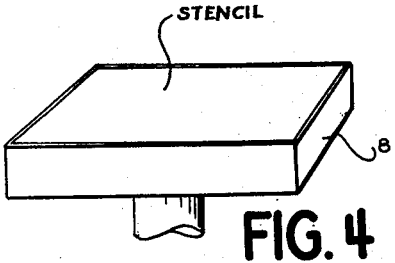
INVENTOR.
Walter J. Carney
BY Patented Apr. 13, 1954

2,674,940

UNITED STATES PATENT OFFICE 2,674,940

MULTIPLE CARD SYSTEM

Walter J. Carney, Watertown, Mass.

Application August 15, 1951, Serial No. 242,012

4 Claims. (Cl. 101—128.2)

The present invention relates to a card system and means for providing in multiple form, certain information such for instance as that given by a guest in making a hotel registration, or in other equivalent places where information cards are filled out, and parts or all of the information are disseminated to different offices, clerks and help in the hotel.

The present invention is particularly applicable for use in well run hotels where efficiency requires that the information derived when a guest registers in the hotel be immediately distributed to various departments and services so that the guest may be well served by the various departments. It is essential for speed and efficiency in the running of such a hotel that the proper information be transmitted and entered on various forms without the necessity of a great deal of handling, writing, copying, or typing, which not only takes time, but costs considerable.

In the system of the present invention a new type of card is used, on which the complete information is quickly entered, immediately after the information has been obtained and this serves as a basis of providing all necessary copies for all and sundry forms where such information is required. For instance, an applicant or party may sign his name and address on the face of the card and then such other information may be immediately added as the clerk receiving the card may require. The clerk then puts the card in a typewriter and types the complete information or such parts as may be required from the record on the face of the card, on the reverse side of the card at the lower end. The position of the writing on the card is such that the clerk can see the original record as he is typing it on the reverse side. The card on the reverse side is provided with a number of backed carbon sheets or the equivalent, lying in face contact with the back surface of the card at its lower end with a carbon flap extending over these sheets from one side and a stencil which may be colored, but preferably white or yellow, extending over the carbon flap from the other side. The carbon backed sheets, the stencil and carbons are all readily removable and each may serve as an individual purpose wherever they are required. By means of such a card, it is possible to provide every department with the necessary and complete information so that no further typing or copying need be done, for that particular party. This is of great utility in registering a guest in a hotel and the same system can be equally well applied for registration and other information of equivalent nature. It may be used for hospital records, for bureaus collecting information such as censors, for compiling multiple records and for many other kinds of services.

Without further describing the merits and advantages of the present invention, the invention will be described in connection with the embodiment illustrated in the drawings annexed hereto, in which—

Figure 1 shows a perspective view of a registration card used in the present system, the card being viewed from what might be designated as the rear side.

Figure 2 shows a view looking at the left side edge of the card of Figure 1.

Figure 3 shows a view looking at the front of the card, and

Figure 4 shows a detail of the transfer stencil pad used in connection with the present system.

Referring particularly to the drawings, Figures 1, 2 and 3, show a registration card 1 with a face side 2' and a reverse side 3', which designation will be hereafter used for the front and back side of the card.

The side face 2' of the card may have printed on its upper portion labelled blank spaces 2, for receiving the desired information which may as indicated, comprise the name and address of the individual, spaces for signature of the individual and other pertinent information, depending upon the services for which the system of the invention is to be used.

The card may also be provided at its face below the upper section with labelled spaces or information, the difference being that all of the information which is to be immediately transferred to the reverse face of the card as will be explained later, should be placed on the card, so that this may be readily visible while the clerk or typist is copying the information on the reverse of the card.

For this purpose the reverse side 3' of the card is provided in its lower section with a pocket which is preferably formed by an outward cover 3 of stencil material, preferably white or yellow in color, which has its lower side edge 4 sealed to the lower side edge 4' of the card in face to face contact by suitable adhesive or other means which will however permit the stencil to be removed without being torn. The other edge of the pocket is sealed by a carbon sheet 5 which lies beneath the stencil in face to face relation to it and is sealed along the line parallel to the lower edge of the sheet as indicated at 6, preferably somewhat below the middle of the card. In this pocket formed by these flaps and the card, there may be contained a number of loose carbon backed papers or slips 7, which are simply inserted in the pocket and may be freely removed. If desired the sheet 5 may be ordinary paper sheet instead of carbon, in which case the top carbon slip will not be written upon. Others beneath the top sheet will be. The sheets 3 and 5 may be applied to the back of the card by the use of adhesive strips rather than by an adhesive at the edge of the cover sheets themselves or in any other suitable manner. The cover sheets may be free at the sides so that the slips can be slid out sideways or removed by turning the flaps back.

The pocket so formed is to be used for typing or writing information which has been placed on the reverse of the card and this preferably is accomplished by typing on the stencil sheet with an ordinary typewriter by means of which not only a proper stencil will be made, but also the carbon slips 7 will have the desired information typed on them. Since this information is on the face of the card, it is essential that the card be sufficiently long and the information on the front be sufficiently high up on the face of the card so that when the card is put into the typewriter for typing on the stencil 3, the face of the card will project upwards in the typewriter sufficiently high so that all this information can be readily seen by the typist as he is transferring it to the stencil sheet on the rear of the card. If there are three or four lines of typing on the stencil sheet, then when the typewriter rolls have been turned, the space necessary to type these three or four lines, the bottom of the information on the face of the card should still be higher than the typewriter rolls, so that it may be seen while the typist is completing the lower line of the stencil.

In the ordinary method in which the system is carried out, as for instance, in a hotel, immediately after the guest registers on the registration card, the registration clerk or clerk near him will put the card in a typewriter and type on the stencil, the name and address of the individual and other information which the hotel may require, as for instance, credit number, how long the guest is expected to remain, number, date, hour of registration, ratio and folio number. All of this information may quickly be typed on the stencil sheet and since beneath the stencil sheet is the carbon slip and the carbon backed slips, this information will be entered on such carbon slips and on the back of the card. The carbon slips are used for various purposes; one may be given to the bell boy to show the guest to his room; another may be given to the guest; another may be used for letter box markings, and other slips may be distributed for other information.

The stencil cover will preferably be placed in a stencil pad of the kind indicated in Figure 4, in which the stencil is simply placed within the top frame of the pad 8 of Figure 4. This stencil pad may be used as a stencil on the cashier's sheet or card and on other cards or sheets used in the particular hotel system. The complete information required on the stencil may occupy no more than three lines since the record will be condensed by the clerk who will enter it in the particular manner that is used in that service. After the stencil has served its purpose, it can be removed from the pad and destroyed or filed, if desired.

In place of the ordinary stencil, other equivalent multi-transfer means, such as, liquid, fluid and gelatin duplicating sheets may be used in which case an actual stencil need not be cut but the information would be typed on the transfer sheet which would occupy the same position as the stencil sheet in this invention.

It will readily be seen that the system for which the card is designed may be used for a great variety of purposes where information is desired and disseminated in a way similar or analagous to the system explained above, so that the invention is not to be limited to a specific mode or use, but to be applied generally in accordance with the spirit of the invention.

Having now described my invention, I claim:

1. In a card system for recording information, a paper sheet with designations at one end thereof establishing said end as the upper front portion of the sheet for recording certain information thereon, two flexible flap sheet members no wider than said paper sheet secured only transversely across the face of the paper sheet, one near the lower rear end of the sheet and the other spaced from said lower rear end of the sheet said flaps overlaying one another, a plurality of paper slips removably held between said sheet and said flaps, said slips having reproductive means for permitting a record to be received thereon when the outer of the two flaps has been inscribed thereon said sheet being adaptable to be inserted in a typewriter with said outer of the two flaps in position to have typed upon it the information at said top front portion of the sheet.

2. In a card system for recording information, a paper sheet with designations at one end thereof establishing said end as the upper front portion of the sheet for recording certain information thereon, two flexible flap sheet members no wider than said paper sheet secured only transversely across the face of the paper sheet, one near the lower rear end of the sheet and the other spaced from said lower rear end of the sheet, said flaps overlaying one another, with the underflap narrower in width than the distance between the secured edges of the flaps to the sheet, a plurality of paper slips having a width to fit in the space between the secured edges of the flaps, said slips having reproductive means for permitting a record to be received thereon when the outer of the two flaps has been inscribed thereon said sheet being adaptable to be inserted in a typewriter with said outer of the two flaps in position to have typed upon it the information at said top front portion of the sheet.

3. In a card system for recording information, a paper sheet with designations at one end thereof establishing said end as the upper front portion of the sheet for recording certain information thereon, two flexible flap sheet members no wider than said paper sheet, secured only transversely across the face of the paper sheet, one near the lower rear end of the sheet and the other spaced from the said lower rear end of the sheet, said flaps overlaying one another, a plurality of paper slips having carbon backs, removably held between, said sheet and said flaps with the under of said top flaps also having a carbon back thereon whereby when the outer of said flaps is inscribed thereon a record will be produced on said paper slips.

4. An arrangement as in claim 1 in which said top flap comprises a type receiving stencil.

References Cited in the file of this patent

UNITED STATES PATENTS

| Number | Name | Date |
|---|---|---|
| 1,069,435 | Krueger | Aug. 5, 1913 |
| 1,127,986 | Green | Feb. 9, 1915 |
| 1,169,813 | Hazel | Feb. 1, 1916 |
| 1,761,722 | Gordenstein | June 3, 1930 |
| 2,070,181 | Ryan | Feb. 9, 1937 |
| 2,134,112 | Efron | Oct. 25, 1938 |
| 2,135,345 | Kelly | Nov. 1, 1938 |
| 2,335,992 | Biskind | Dec. 7, 1943 |
| 2,405,508 | Lindsay | Aug. 6, 1946 |

FOREIGN PATENTS

| Number | Country | Date |
|---|---|---|
| 962,748 | France | June 19, 1950 |